United States Patent
Tani et al.

(10) Patent No.: US 7,583,493 B2
(45) Date of Patent: Sep. 1, 2009

(54) MONOLITHIC SEMICONDUCTOR CERAMIC CAPACITOR HAVING VARISTOR FUNCTION AND METHOD FOR MANUFACTURING MONOLITHIC SEMICONDUCTOR CERAMIC CAPACITOR

(75) Inventors: Shinsuke Tani, Takatsuki (JP); Mitsutoshi Kawamoto, Hirakata (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 35 days.

(21) Appl. No.: 12/024,730

(22) Filed: Feb. 1, 2008

(65) Prior Publication Data
US 2008/0117561 A1 May 22, 2008

Related U.S. Application Data

(63) Continuation of application No. PCT/JP2007/061106, filed on May 31, 2007.

(30) Foreign Application Priority Data

| Jul. 3, 2006 | (JP) | ............................. 2006-183549 |
| Jan. 30, 2007 | (JP) | ............................. 2007-018745 |

(51) Int. Cl.
  *H01G 4/06* (2006.01)
(52) U.S. Cl. ................. 361/321.4; 361/321.5; 29/25.42
(58) Field of Classification Search ... 361/321.1–321.5, 361/311, 303; 29/25.42
See application file for complete search history.

(56) References Cited

U.S. PATENT DOCUMENTS

| 5,268,006 A | * | 12/1993 | Ueno et al. ................. 29/25.03 |
| 2002/0197793 A1 | * | 12/2002 | Dornfest et al. ............. 438/253 |
| 2003/0020157 A1 | * | 1/2003 | Natori et al. ................. 257/703 |
| 2003/0096125 A1 | * | 5/2003 | Ogasawara et al. ......... 428/469 |
| 2003/0137797 A1 | * | 7/2003 | Kimoto et al. ........... 361/321.2 |

FOREIGN PATENT DOCUMENTS

| JP | 57-64918 A | 4/1982 |
| JP | 57-207323 A | 12/1982 |
| JP | 2-240904 A | 9/1990 |
| JP | 11302072 A | * 11/1999 |

* cited by examiner

*Primary Examiner*—Eric Thomas
(74) *Attorney, Agent, or Firm*—Dickstein Shapiro LLP

(57) ABSTRACT

A monolithic semiconductor ceramic capacitor includes semiconductor ceramic layers made of a semiconductor ceramic having a Sr site and a Ti site. The semiconductor ceramic satisfies the inequality $1.000 < m \leq 1.020$, wherein m represents the molar ratio of the Sr site to the Ti site. The semiconductor ceramic contains crystal grains and has grain boundary layers. The crystal grains contain a donor element such as La or Sm in the form of a solid solution. The grain boundary layers contain an acceptor element such as Mn, Co, Ni or Cr. The amount of the acceptor element therein is equal to or less than 0.5 mol (preferably 0.3 to 0.5 mol) per 100 mol of Ti. The crystal grains have an average size of 1.0 μm or less (preferably 0.5 to 0.8 μm). Therefore, the monolithic semiconductor ceramic capacitor has good electrical properties, good resistivity, good dielectric strength, and high reliability and is suitable for thin or compact apparatuses.

20 Claims, 1 Drawing Sheet

US 7,583,493 B2

MONOLITHIC SEMICONDUCTOR CERAMIC CAPACITOR HAVING VARISTOR FUNCTION AND METHOD FOR MANUFACTURING MONOLITHIC SEMICONDUCTOR CERAMIC CAPACITOR

This is a continuation of application Serial No. PCT/JP2007/061106, filed May 31, 2007.

TECHNICAL FIELD

The present invention relates to monolithic semiconductor ceramic capacitors having a varistor function and methods for manufacturing the monolithic semiconductor ceramic capacitors. The present invention particularly relates to a monolithic semiconductor ceramic capacitor which has a varistor function, which is of a boundary insulative layer type, and which contains $SrTiO_3$ and also relates to a method for manufacturing the monolithic semiconductor ceramic capacitor.

BACKGROUND ART

Developments in electronics has led to the widespread use of mobile electronic devices such as mobile phones and notebook personal computers and vehicle-mounted electronic devices. Compact multi-functional electronic devices have been recently demanded.

In order to manufacture the compact multi-functional electronic devices, various semiconductor elements such as ICs and LSIs are used. This leads to a reduction in the noise resistance of electronic devices.

Bypass capacitors such as film capacitors, monolithic ceramic capacitors, and semiconductor ceramic capacitors are connected to power supply lines of ICs and LSIs such that the electronic devices have high noise resistance.

These capacitors absorb low-voltage or high-frequency noise and do not absorb high-voltage pulses or static electricity. Therefore, the application of the high-voltage pulses or static electricity to the electronic devices can cause the malfunction of the electronic devices or the breakage of semiconductor elements and can particularly cause the breakage of compact capacitors having low capacitance.

Boundary insulative layer-type monolithic semiconductor ceramic capacitors having a varistor function have been proposed. The boundary insulative layer-type monolithic semiconductor ceramic capacitors contain $SrTiO_3$ and have high noise-absorbing properties, good temperature stability, good frequency stability, high pulse resistance and high pulse-absorbing properties.

For example, Patent Document 1 discloses a boundary insulative layer-type monolithic semiconductor ceramic capacitor containing $Sr_{(1-x)}Ba_xTiO_3$, $MnO_2$, $SiO_2$, and 0.05 to 5.0 mole percent of at least one member selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$, the total $MnO_2$ and $SiO_2$ content being 0.2 to 5.0 mole percent. In $Sr_{(1-x)}Ba_xTiO_3$, the content of Ti is excessive and the inequalities $0.95 \leq Sr_{(1-x)}Ba_x/Ti \leq 1.00$ and $0 < x \leq 0.3$ exist.

According to Patent Document 1, the boundary insulative layer-type monolithic semiconductor ceramic capacitor usually absorbs low-voltage noise and/or high-frequency noise and functions as a varistor when a high voltage such as a pulse or static electricity is applied to the boundary insulative layer-type semiconductor ceramic capacitor. A process for co-firing a ceramic material and a material for forming internal electrodes can be used to manufacture the boundary insulative layer-type monolithic semiconductor ceramic capacitor.

Patent Document 1: Japanese Unexamined Patent Application Publication No. 2-240904

DISCLOSURE OF THE INVENTION

Problems to be Solved by the Invention

In order to mount a boundary insulative layer-type monolithic semiconductor ceramic capacitor in a compact multi-functional electronic device, the boundary insulative layer-type monolithic semiconductor ceramic capacitor needs to have a small size and the semiconductor ceramic layers included therein need to have a small thickness. Therefore, crystal grains in the semiconductor ceramic layers preferably have an average size of 1.0 µm or less.

As disclosed in Patent Document 1, a process for co-firing the ceramic material and the internal electrode-forming material can be used to manufacture the boundary insulative layer-type monolithic semiconductor ceramic capacitor. The results of experiments performed by the inventors have showed that crystal grains used for the process have an average size greater than 1.0 µm. This suggests that an apparatus including the boundary insulative layer-type monolithic semiconductor ceramic capacitor is limited in thickness and/or size.

In order to put monolithic semiconductor ceramic capacitors into practical use, the monolithic semiconductor ceramic capacitors need to have sufficient insulating properties and high reliability, and therefore need to have high resistivity and dielectric strength.

The results of experiments performed by the inventors have showed that the boundary insulative layer-type monolithic semiconductor ceramic capacitor disclosed in Patent Document 1 has insufficient resistivity or dielectric strength for compact devices and therefore is low in reliability.

The present invention has been made in view of the above circumstances. It is an object of the present invention to provide a monolithic semiconductor ceramic capacitor having a varistor function. The monolithic semiconductor ceramic capacitor has good electrical properties, high resistivity, high dielectric strength and high reliability, and is suitable for thin or compact apparatuses. It is another object of the present invention to provide a method for manufacturing the monolithic semiconductor ceramic capacitor.

Means for Solving the Problems

The $SiTiO_3$-based boundary insulative layer-type monolithic semiconductor ceramic capacitor disclosed in Patent Document 1 contains a predetermined amount of $MnO_2$ and $SiO_2$. When the molar ratio m of the Sr site to the Ti site in the capacitor is greater than 1.00, the amount of the Sr site is excessive and therefore a $MnO_2$—$SiO_2$—$TiO_2$ liquid phase is prevented from being formed. This prevents the formation of a boundary insulative layer-type structure and causes the oxidation and/or diffusion of internal electrodes. Hence, the capacitor has insufficient electrical properties and low reliability.

The inventors have made intensive investigations and found that when the molar ratio m of the Sr site to the Ti site is greater than 1.000, the $MnO_2$—$SiO_2$—$TiO_2$ liquid phase prevented from being formed but the promotion of sintering is also prevented. The prevention of the promotion of sintering suppresses the growth of grains during firing to provide a semiconductor ceramic structure having fine, uniform crystal grains with an average size of 1.0 µm or less and therefore thinner layers can be achieved. Since the crystal grains have such a small size, oxygen can readily reach grain boundary layers and therefore Schottky barriers are readily formed. This allows re-oxidation to occur; hence, the grain boundary layers have high resistivity. This leads to an enhancement in reliability.

When the molar ratio m is greater than 1.020, a Sr surplus in the crystal grains significantly precipitates in the grain boundary layers and therefore the grain boundary layers have a large thickness. However, when the molar ratio m is 1.020 or less, Sr can be prevented from precipitating in the grain boundary layers. The prevention of the precipitation of Sr in the grain boundary layers allows the grain boundary layers to have a small thickness, thereby achieving relatively high apparent dielectric constant $\in r_{APP}$.

The apparent dielectric constant can be given by the following formula:

$$\in r_{APP} \propto \in r \cdot d/t \qquad (1)$$

wherein $\in r_{APP}$ represents the apparent dielectric constant, $\in r$ represents the dielectric constant of the grain boundary layers, t represents the average thickness of the grain boundary layers, and d represents the average size of the crystal grains.

If the average size d of the crystal grains is reduced to 1.0 μm or less, the apparent dielectric constant $\in r_{APP}$ can be increased by reducing the average thickness t of the grain boundary layers.

When the molar ratio m is 1.020 or less, the precipitation of Sr in the grain boundary layers is prevented and therefore the grain boundary layers have a small thickness. This results in an increase in apparent dielectric constant $\in r_{APP}$.

Furthermore, Patent Document 1 discloses that when the total $MnO_2$ and $SiO_2$ content is less than 0.1 mole percent, the $MnO_2$—$SiO_2$—$TiO_2$ liquid phase is prevented from being formed and therefore the boundary insulative layer-type structure is prevented from being formed. This leads to a reduction in electric property or sintering density.

The inventors have made intensive investigations on dielectric strength on the assumption that unusually high voltages such as high-voltage pulses and static electricity may be applied to capacitors. As a result, the inventors have found that when grain boundary layers in a capacitor contain Mn, serving as an acceptor, such that the amount of Mn therein is greater than 0 mol and equal to or less than 0.5 mol per 100 mol of Ti, the capacitor has good dielectric strength and the apparent dielectric constant $\in r_{APP}$ of the capacitor is not low. In particular, a capacitor having good dielectric strength and low capacitance can be achieved.

These findings can be probably a thickness of acceptor elements other than Mn.

The present invention has been made on the basis of the above findings. A monolithic semiconductor ceramic capacitor having a varistor function (hereinafter simply referred to as "monolithic semiconductor ceramic capacitor"), according to the present invention includes a monolithic sintered body and external electrodes located on both end surfaces of the monolithic sintered body. The monolithic sintered body is formed by firing a plurality of semiconductor ceramic layers and internal electrodes alternately arranged. The semiconductor ceramic layers are made of a semiconductor ceramic which is of a boundary insulative layer-type and which contains $SrTiO_3$. The external electrodes are electrically connected to the internal electrodes. The semiconductor ceramic has a Sr site, a Ti site, crystal grains, and grain boundary layers and satisfies the inequality 1.000<m≦1.020, where m represents the molar ratio of the Sr site to the Ti site. The crystal grains contain a donor element in the form of a solid solution. The grain boundary layers contain an acceptor element. The amount of the acceptor element therein is greater than 0 mol and equal to or less than 0.5 mol per 100 mol of Ti. The crystal grains have an average size of 1.0 μm or less.

In order to achieve a desired dielectric strength, good electrical properties, and good insulating properties, the amount of the acceptor element is preferably 0.3 to 0.5 mol per 100 mol of Ti.

In the monolithic semiconductor ceramic capacitor, the acceptor element is at least one element selected from the group consisting of Mn, Co, Ni and Cr.

In the monolithic semiconductor ceramic capacitor, the donor element is at least one element selected from the group consisting of La, Sm, Dy, Ho, Y, Nd, Ce, Nb, Ta and W.

In order to achieve good electrical properties and high reliability, the crystal grains preferably have an average size of 0.5 to 0.8 μm.

In the monolithic semiconductor ceramic capacitor, the crystal grains have an average size of 0.5 to 0.8 μm.

Investigation results obtained by the inventors have suggested that the presence of a low-melting point oxide is effective in preventing the precipitation of the acceptor element in the grain boundary layers when the amount of the low-melting point oxide is equal to or less than 0.1 mol per 100 mol of Ti.

In the monolithic semiconductor ceramic capacitor, the low-melting point oxide is $SiO_2$.

The present invention provides a method for manufacturing monolithic semiconductor ceramic capacitor having a varistor function, containing a semiconductor ceramic which is of a boundary insulative layer-type and which contains $SrTiO_3$. The method includes a pre-fired powder-preparing step of weighing ceramic raw materials including a donor compound such that the inequality 1.000≦m≦1.020 holds, mixing the ceramic raw materials, and then pre-firing the mixture to prepare a pre-fired powder, where m represents the molar ratio of the Sr site to the Ti site; a heat-treated powder-preparing step of weighing an acceptor element such that the amount of the acceptor element is greater than 0 mol and equal to or less than 0.5 mol per 100 mol of Ti, mixing the acceptor element with the pre-fired powder, and then heat-treating this mixture to prepare a heat-treated powder; a laminate-preparing step of forming green ceramic sheets from the heat-treated powder and then alternately stacking the green ceramic sheets and internal electrode layers to prepare a laminate; and a firing step of primarily firing the laminate in a reducing atmosphere and then secondarily firing the resulting laminate in a slight reducing, air, or oxidizing atmosphere.

In the method, that mixture is pre-fired such that crystal grains in the pre-fired powder have an average size of 1.0 μm or less.

In the method, the pre-firing temperature of that mixture is higher than the primarily firing temperature of the laminate.

Advantages

A monolithic semiconductor ceramic capacitor having a varistor function according to the present invention includes semiconductor ceramic layers made of a semiconductor ceramic that has a Sr site, a Ti site, crystal grains, and grain boundary layers. The semiconductor ceramic satisfies the inequality 1.000<m≦1.020, wherein m represents the molar ratio of the Sr site to the Ti site. The crystal grains contain a donor element such as La, Sm, Dy, Ho, Y, Nd, Ce, Nb, Ta or W in the form of a solid solution. The grain boundary layers contain an acceptor element such as Mn, Co, Ni or Cr. The amount of the acceptor element therein is greater than 0 mol and equal to or less than 0.5 mol (preferably 0.3 to 0.5 mol)

per 100 mol of Ti. The crystal grains have an average size of 1.0 μm or less (preferably 0.5 to 0.8 μm). Therefore, the monolithic semiconductor ceramic capacitor has a large apparent dielectric constant $\in_{r_{APP}}$, good electric properties, good insulating properties, and good dielectric strength and is suitable for thin or compact apparatuses. Although the monolithic semiconductor ceramic capacitor is compact and has low capacitance, the monolithic semiconductor ceramic capacitor has good dielectric strength.

A method for manufacturing monolithic semiconductor ceramic capacitor according to the present invention includes a pre-fired powder-preparing step of weighing ceramic raw materials including a donor compound such that the inequality 1.000<m≦1.020 holds, mixing the ceramic raw materials, and then pre-firing the mixture to prepare a pre-fired powder, where m represents the molar ratio of a Sr site to a Ti site; a heat-treated powder-preparing step of weighing an acceptor element such that the amount of the acceptor element is greater than 0 mol and equal to or less than 0.5 mol per 100 mol of Ti, mixing the acceptor element with the pre-fired powder, and then heat-treating this mixture to prepare a heat-treated powder; a laminate-preparing step of forming green ceramic sheets from the heat-treated powder and then alternately stacking the green ceramic sheets and internal electrode layers to prepare a laminate; and a firing step of primarily firing the laminate in a reducing atmosphere and then secondarily firing the resulting laminate in a slight reducing, air, or oxidizing atmosphere. Therefore, the monolithic semiconductor ceramic capacitor can be efficiently manufactured.

Figure 1:
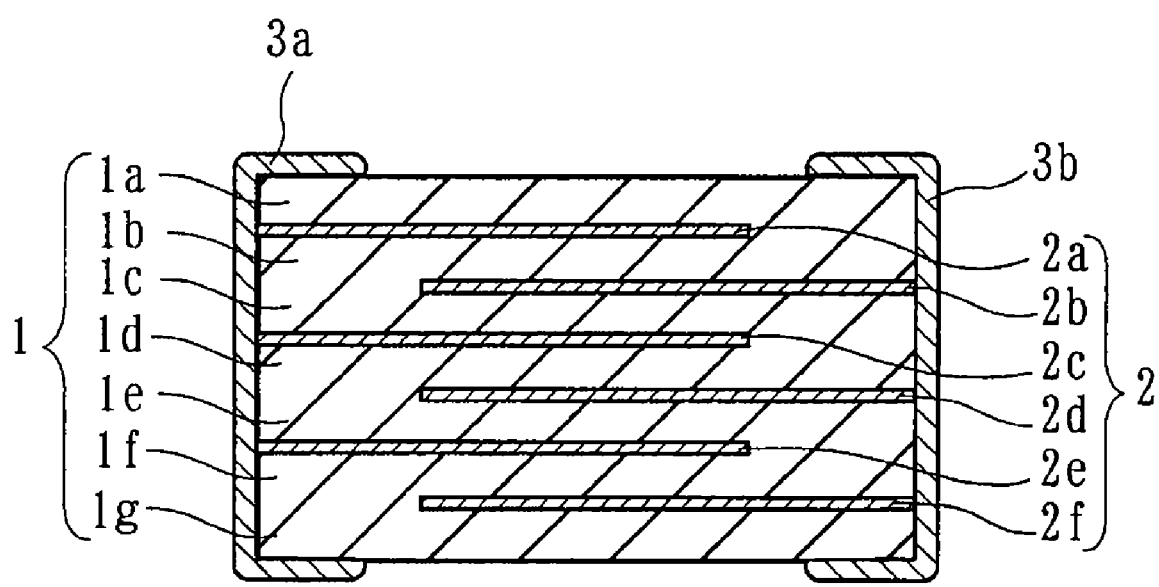
FIG. 1 is a schematic sectional view of a monolithic semiconductor ceramic capacitor according to an embodiment of the present invention.

REFERENCE NUMERALS 1 element body (monolithic sintered body)
1a to 1g semiconductor ceramic layers
2 and 2a to 2f internal electrodes
3a and 3b external electrodes

BEST MODE FOR CARRYING OUT THE INVENTION

Embodiments of the present invention will now be described in detail.

FIG. 1 is a schematic sectional view of a monolithic semiconductor ceramic capacitor according to an embodiment of the present invention.

The monolithic semiconductor ceramic capacitor includes an element body 1 and external electrodes 3a and 3b located on both end portions of the element body 1.

The element body 1 includes a sintered body, prepared by firing, including a plurality of semiconductor ceramic layers 1a to 1g and internal electrode layers 2a to 2f alternately arranged. The internal electrode layers 2a, 2c and 2e are exposed at one of the end surfaces of the element body 1 and are electrically connected to the external electrode 3a. The internal electrode layers 2b, 2d and 2f are exposed at the other end surface of the element body 1 and are electrically connected to the external electrode 3b.

The semiconductor ceramic layers 1a to 1g contain a plurality of crystal grains including semiconductive material and boundary layers (not shown) surrounding the crystal grains when being observed on a microscopic level. The crystal grains and the boundary layers located therebetween form sub-capacitors. The sub-capacitors located between the internal electrode layer 2a, 2c or 2e and the internal electrode layer 2b, 2d or 2f are connected to each other in series or in parallel. This allows the monolithic semiconductor ceramic capacitor to have a desired capacitance. The apparent dielectric constant $\in_{r_{APP}}$ can be determined from the capacitance thereof and the size of the element body 1.

The semiconductor ceramic layers 1a to 1g are made of a semiconductor ceramic which contains $SrTiO_3$ and which is of a boundary insulative layer-type. The semiconductor ceramic satisfies the inequality 1.000<m≦1.020, wherein m represents the molar ratio of the Sr site to the Ti site in the semiconductor ceramic. The crystal grains contain a donor element in the form of a solid solution. An acceptor element is present in the boundary layers and the amount of the acceptor element therein is greater than 0 mol and equal to or less than 0.5 mol per 100 mol of Ti. The crystal grains have an average size of 1.0 μm or less.

Since the crystal grains contain the donor element, the crystal grains are semiconductive. Since the inequality 1.000<m≦1.020 holds as described above, that is, since the number of moles of the Sr site is greater than the stoichiometric number thereof, coarsening of the crystal grains and reduction of the resistivity of the crystal grains are prevented. Since the amount of the acceptor element in the boundary layers is greater than 0 mol and equal to or less than 0.5 mol per 100 mol of Ti, the boundary layers have high dielectric strength.

Since the semiconductor ceramic has the above composition, the monolithic semiconductor ceramic capacitor has desired electrical properties and high reliability although the crystal grains have an average size of 1.0 μm or less. The monolithic semiconductor ceramic capacitor has desired dielectric strength although the monolithic semiconductor ceramic capacitor is compact and is low in capacitance.

The reason why the amount of the acceptor element in the boundary layers is set to be greater than 0 mol and equal to or less than 0.5 mol per 100 mol of Ti is as described below.

Since the acceptor element is present in the boundary layers, the boundary layers have an energy level (boundary level) sufficient for electrical excitation to facilitate the formation of Schottky barriers and therefore have high resistivity. This allows the monolithic semiconductor ceramic capacitor to have good insulating properties.

An increase in the number of moles of the acceptor element in the boundary layers facilitates the formation of the Schottky barriers. However, it is not preferable that the amount of the acceptor element in the boundary layers be greater than 0.5 mol per 100 mol of Ti because the boundary layers then have low dielectric strength.

In this embodiment, the amount of the acceptor element in the boundary layers is therefore greater than 0 mol and equal to or less than 0.5 mol per 100 mol of Ti.

In order to allow the monolithic semiconductor ceramic capacitor to have the desired dielectric strength, a better apparent dielectric constant $\in_{r_{APP}}$, and better insulating properties (resistivity), the amount of the acceptor element in the boundary layers is preferably 0.3 to 0.5 mol per 100 mol of Ti.

Examples of the acceptor element include, but are not limited to, Mn, Co, Ni and Cr. The acceptor element is preferably Mn.

Since the amount of the acceptor element in the boundary layers is limited to be equal to or less than 0.5 mol per 100 mol of Ti, the boundary layers have high dielectric strength. However, the boundary layers have low resistivity because the formed Schottky barriers are insufficient.

In this embodiment, the molar ratio m of the Sr site to the Ti site is set to be greater than 1.000. This prevents a reduction in resistivity.

When the molar ratio m is 1.000, no substance preventing the growth of ceramic grains is present in the boundary layers and therefore the crystal grains are largely grown. This leads to the coarsening of the crystal grains. When the molar ratio m is less than 1.000, the number of moles of Ti is greater than the stoichiometric number (1.000) thereof (i.e., is Ti site-rich) and therefore the Ti surplus of the solid solution in the crystal grains precipitates in the boundary layers. The Ti precipitate in the boundary layers forms a liquid phase together with the acceptor element in the boundary layers to excessively promote the growth of the crystal grains. This causes a coarsening of the crystal grains. The coarsening of the crystal grains prevents the diffusion of oxygen in the boundary layers. This may cause a reduction in the resistivity of the boundary layers.

When the amount of Sr is excessive (Sr site-rich) such that the molar ratio m exceeds 1.000, the Sr surplus of the solid solution in the crystal grains precipitates in the boundary layers to prevent the growth of the crystal grains.

This allows the crystal grains to have an average size of 1.0 μm or less. Since the crystal grains have an average size of 1.0 μm or less and therefore are fine, oxygen readily diffuses in the boundary layers to promote the formation of the Schottky barriers. This prevents the reduction of resistivity.

Since the number of moles of Sr is greater than the stoichiometric number (m>1.000) although the amount of the acceptor element is equal to or less than 0.5 mol per 100 mol of Ti, the formation of the Schottky barriers is promoted and therefore desired resistivity can be achieved.

When the molar ratio m is, however, greater than 1.020, the Sr surplus of the solid solution in the crystal grains massively precipitates in the boundary layers and therefore the boundary layers have a large thickness. This causes a reduction in apparent dielectric constant $\in r_{APP}$ because of the reason described in the section "Means for Solving the Problems".

In this embodiment, the composition of ceramic raw materials such as a Sr compound and a Ti compound is adjusted such that the molar ratio m satisfies the inequality $1.000 < m \leq 1.020$.

Since the inequality is $1.000 < m \leq 1.020$, a relatively large apparent dielectric constant $\in r_{APP}$ can be obtained although the crystal grains have a small average size of 1.0 μm.

The semiconductor ceramic preferably contains a low-melting point oxide such that the amount of the low-melting point oxide therein is equal to or less than 0.1 mol per 100 mol of Ti. The presence of the low-melting point oxide improves sintering properties of the semiconductor ceramic and promotes the precipitation of the acceptor element in the boundary layers.

The reason why the amount of low-melting point oxide is limited as described above is as follows: when the amount of low-melting point oxide is greater than 0.1 mol per 100 mol of Ti, the apparent dielectric constant $\in r_{APP}$ is reduced and desired electrical properties cannot be obtained.

Examples of the low-melting point oxide include, but are not limited to, $SiO_2$; a glass ceramic containing B and/or an alkali metal element such as K, Li or Na; and copper tungstate. The low-melting point oxide is preferably $SiO_2$.

The semiconductor ceramic contains the donor element such that the ceramic raw materials are rendered semiconductive upon firing the ceramic raw materials in a reducing atmosphere. The content of the donor element is not particularly limited. When the amount of the donor element is less than 0.8 mol per 100 mol of Ti, the apparent dielectric constant $\in r_{APP}$ may be reduced. In contrast, when the amount of the donor element is greater than 2.0 mol per 100 mol of Ti, a surplus of the donor element is present in the solid solution and therefore precipitates in the boundary layers. This can causes a reduction in apparent dielectric constant $\in r_{APP}$. Therefore, the amount of the donor element is preferably 0.8 to 2.0 mol per 100 mol of Ti.

The donor element is, but is not limited to, preferably at least one selected from the group consisting of La, Sm, Dy, Ho, Y, Nd, Ce, Nb, Ta and W.

The average size of the crystal grains in the semiconductor ceramic layers can be readily adjusted to be 1.0 μm or less by controlling the specific surface area of the Ti compound and/or manufacturing conditions such as the firing temperature and the sintering temperature.

A method for manufacturing the monolithic semiconductor ceramic capacitor according to an embodiment of the present invention will now be described.

The following ceramic raw materials are prepared and then weighed: a Sr compound, such as $SrCO_3$ or the like; a donor compound containing the donor element such as La, Sm, or the like; and fine particles of the Ti compound such as $TiO_2$ or the like. The fine particles have a specific surface area of, for example, 10 m²/g or more (an average size of about 0.1 μm or less).

The weighed compounds are mixed with a predetermined amount (for example, one to three weight parts) of a dispersant. The mixture is charged into a ball mil together with a grinding medium such as PSZ (partially stabilized zirconia) balls and water. The mixture is sufficiently mixed with water in the ball mill, whereby slurry is prepared.

The slurry is dried and then pre-fired at a predetermined temperature (for example, 1300° C. to 1450° C.) for two hours an air atmosphere, whereby a pre-fired powder containing the donor element is prepared.

The low-melting point oxide, $SiO_2$ or the like, is weighed such that the amount of the low-melting point oxide is equal to 0 to 0.1 mol per 100 mol of Ti. An acceptor compound containing the acceptor element, 4 Mn, Co or the like, is weighed such that the amount of the acceptor element is equal to or less than 0.5 mol (preferably equal to 0.3 to 0.5 mol) per 100 mol of Ti. The low-melting point oxide, the acceptor compound, the pre-fired powder, and water are mixed together. A dispersant may be mixed with these materials as required. The mixture is dried and then heat-treated at a predetermined temperature (for example, 500° C. to 600° C.) for five hours in an air atmosphere, whereby a heat-treated powder is prepared.

An appropriate amount of an organic solvent such as toluene or alcohol and/or an appropriate amount of the dispersant is added to the heat-treated powder. These materials are charged into the ball mil together with the grinding medium and then wet-mixed in the ball mill, whereby a ceramic slurry is prepared.

The ceramic slurry is formed into green ceramic sheets by a known process such as a doctor blade process, a lip coating process, or a die coating process such that fired ceramic sheets have a predetermined thickness (for example, about 1 to 2 μm).

An internal electrode-forming conductive paste is applied onto some of the green ceramic sheets by a transfer process such as a screen printing process, a gravure printing process, a vacuum vapor deposition process or a sputtering process, whereby a conductive layer having a predetermined pattern is formed on each green ceramic sheet.

The conductive material contained in the internal electrode-forming conductive paste is not particularly limited and is preferably a base metal such as Ni or Cu.

A number of the green ceramic sheets having the conductive layers are stacked in a predetermined direction. The stacked green ceramic sheets are sandwiched between the green ceramic sheets having no conductive layer. These ceramic green sheets are pressed and then cut, whereby a laminate having a predetermined size is prepared.

The laminate is degreased at a temperature of 200° C. to 300° C. in an air atmosphere and then further degreased at a temperature of 700° C. to 800° C. in a slightly reducing atmosphere, as required. The laminate is primarily fired at a temperature of 1100° C. to 1300° C. for about two hours in a firing furnace having a reducing atmosphere which is supplied with a hydrogen gas and a nitrogen gas such that the ratio of the flow rate of the hydrogen gas to that of the nitrogen gas is adjusted within a predetermined range (for example, 0.025:100 to 1:100), whereby the laminate is rendered semiconductive.

Since the pre-firing temperature (1300° C. to 1450° C.) is higher than the primary firing temperature (1100° C. to 1300° C.), the growth of the crystal grains is hardly promoted during primary firing. This prevents the crystal grains from being coarsened. Since the pre-fired powder is prepared such that the crystal grains have an average size of 1.0 μm or less, the average size of the crystal grains can be controlled to be 1.0 μm or less after the laminate is primarily fired. When the crystal grains need to have an average size close to 1 μm, the primary firing temperature may be adjusted to a high value within the range from 1100° C. to 1300° C.

If the primary firing temperature is higher than the pre-firing temperature, the average size of the crystal grains can be controlled to be 1.0 μm or less in such a manner that the primary firing temperature and the pre-firing temperature are adjusted to be close to each other.

After the laminate is rendered semiconductive, the laminate is secondarily fired at a temperature of 600° C. to 900° C. for one hour in a slightly reducing atmosphere, an air atmosphere, or an oxidizing atmosphere such that an internal electrode material such as Ni or Cu is not oxidized. The semiconductor ceramic is re-oxidized such that the boundary insulative layers are formed, whereby the element body 1 containing the internal electrodes 2 is obtained.

An external electrode-forming conductive paste is applied onto both end portions of the element body 1 and then baked such that the external electrodes 3a and 3b are formed, whereby the monolithic semiconductor ceramic capacitor is manufactured.

The external electrodes 3a and 3b may be formed by printing, vacuum vapor deposition or sputtering. Alternatively, the external electrodes 3a and 3b may be formed in such a manner that an external electrode-forming conductive paste is applied onto both end portions of the unfired laminate and then fired together with the unfired laminate.

A conductive material contained in the external electrode-forming conductive paste is not particularly limited and is preferably Ga, In, Ni or Cu. Ag electrodes may be formed on these electrodes.

In this embodiment, the semiconductor ceramic used to form the semiconductor ceramic layers 1a to 1g is prepared such that the molar ratio m of the Sr site to the Ti site in the satisfies the inequality $1.000 < m \leq 1.020$. The donor element, which is La, Sm, Dy, Ho, Y, Nd, Ce, Nb, Ta, W or the like, is contained in the crystal grains. The acceptor element, which is Mn, Co, Ni, Cr or the like, is present in the boundary layers and the amount of the acceptor element is equal to or less than 0.5 mol (preferably 0.3 to 0.5 mol) per 100 mol of Ti. The crystal grains have an average size of 1.0 μm or less (preferably 0.5 to 0.8 μm). Therefore, the monolithic semiconductor ceramic capacitor absorbs low-voltage noise and/or high-frequency noise, functions as a varistor when a high voltage such as a pulse or static electricity is applied to the monolithic semiconductor ceramic capacitor, has high reliability and desired electrical properties, and is suitable for thin or compact apparatuses.

Conventional compact, low-capacitance monolithic ceramic capacitors have low dielectric strength. However, according to the above embodiments, the monolithic semiconductor ceramic capacitor has high dielectric strength although the monolithic semiconductor ceramic capacitor is compact and has low capacitance.

The present invention is not limited to the above embodiments. In the embodiments, the solid solution is formed by a solid phase process. The solid solution is not particularly limited and may be formed by an arbitrary process such as a hydrothermal synthesis process, a sol-gel process, a hydrolysis process or a coprecipitation process.

Examples of the present invention will now be described in detail.

EXAMPLE 1

The following ceramic raw materials were prepared: $SrCO_3$, $LaCl_3$ and particles of $TiO_2$. The $TiO_2$ particles had a specific surface area of 30 $m^2/g$ (an average size of about 30 nm). $LaCl_3$ was weighed such that the content of La was 1.2 mol per 100 mol of Ti. $SrCO_3$ and $TiO_2$ were weighed such that the molar ratio of the Sr site to the Ti site was as shown in Table 1. Three parts by weight of an ammonium polycarboxylate serving as a dispersant was added to 100 parts by weight of the weighed compounds. The mixture was charged into a ball mill together with PSZ balls, serving as boulders, having a diameter of 2 mm and pure water and then wet-mixed for 16 hours in the ball mill, whereby slurry was prepared.

The slurry was dried and then pre-fired at 1350° C. for two hours in an air atmosphere, whereby a pre-fired powder with crystal grains containing La in the form of a solid solution was obtained.

$MnCO_3$, tetraethoxysilane ($Si(OC_2H_5)_4$) and a dispersant were added to the pre-fired powder such that the content of Mn per 100 mol of Ti was as shown in Table 1, the content of $SiO_2$ was 0.1 mol per 100 mol of Ti, and the content of the dispersant was one weight percent. The mixture was charged into a ball mill together with PSZ balls having a diameter of 2 mm and pure water and then wet-mixed for 16 hours in the ball mill.

In this embodiment, the pre-fired powder is pulverized by placing the PSZ balls used for wet mixing into the ball mill such that the pre-fired powder has fine, uniform tetragonal crystal grains (primary grains). The pre-fired powder may be wet-mixed without placing the PSZ balls into the ball mill, that is, without pulverizing the pre-fired powder.

The mixture is dried and then heat-treated at 600° C. for five hours in an air atmosphere, whereby a heat-treated powder was obtained. An aqueous solution of $MnCl_2$ or $MnO_2$ sol may be used instead of MnCO$_3$. SiO$_2$ sol may be used instead of tetraethoxysilane (Si (OC$_2$H$_5$)$_4$).

An organic solvent such as toluene or alcohol and a dispersant were added to the heat-treated powder. This mixture was charged into a ball mill together with PSZ balls having a diameter of 2 mm and then wet-mixed for eight hours in the ball mill. This mixture was wet-mixed with polyvinylbutyral (PVB) serving as a binder, dioctyl phthalate (DOP) serving as a plasticizer, and a cationic surfactant for 16 hours, whereby a ceramic slurry was prepared.

The ceramic slurry was formed into green ceramic sheets by a doctor blade process. An internal electrode-forming conductive paste principally containing Ni was applied onto some of the green ceramic sheets by screen printing, whereby a conductive layer having a predetermined pattern was formed on each such green ceramic sheet.

A number of the green ceramic sheets having the conductive layers were stacked in a predetermined direction. The stacked green ceramic sheets were sandwiched between the green ceramic sheets having no conductive layer. These ceramic green sheets were pressed with a pressure of 20 MPa, whereby a laminate including the green ceramic sheets and internal electrodes alternately arranged was obtained.

The laminate was degreased at 280° C. for five hours in a nitrogen atmosphere and then further degreased at 800° C. for five hours at an oxygen partial pressure in equilibrium with Ni.

The resulting laminate was primarily fired at 1250° C. for two hours in a reducing atmosphere in which the ratio of the flow rate of hydrogen to that of nitrogen was adjusted to 1:100, whereby the laminate was rendered semiconductive. The firing temperature was varied depending on samples such that the CR product was maximized.

The resulting laminate was secondarily fired at 800° C. for one hour in an air atmosphere, whereby the laminate was re-oxidized. End surfaces of the laminate were polished, whereby a component body (monolithic sintered body) was prepared. In—Ga was provided on both end surfaces of the component body. Samples 1 to 31 (monolithic semiconductor ceramic capacitors) were prepared in the same manner as described above. The obtained samples had a length L of 4 mm, a width W of 3 mm and a thickness T of 1 mm, and included semiconductor ceramic layers having internal electrodes. The semiconductor ceramic layers had a thickness of 13 μm. The number of the semiconductor ceramic layers included in each sample was ten (the thickness of the sample was adjusted using outer layers). The internal electrodes located between the semiconductor ceramic layers had an effective area of 2.8 mm$^2$.

Samples 1 to 31 were observed with a scanning electron microscope (SEM). SEM images of surfaces and fracture surfaces of the samples were analyzed, whereby the average size (average crystal grain size) of crystal grains was determined.

The samples were evaluated for ESD (electrostatic discharge) immunity according to IEC 61000-4-2 (international standard) specifying an electrostatic discharge immunity test.

The samples were measured for capacitance with an impedance analyzer (HP 4194A, available from Hewlett-Packard Company) under the following conditions: a frequency of 1 kHz and a voltage of 1V. The apparent dielectric constant $\epsilon r_{APP}$ of each sample was calculated from the capacitance and size of the sample.

The current leaking from the sample was measured in such a manner that a direct voltage of 10 V was applied to the sample for two minutes. The insulation resistance of the sample was determined from the leakage current thereof. The resistivity log ρ (Ω·cm) of the sample at a field strength of 1 V/μm was determined from the insulation resistance and size thereof.

Table 1 shows the compositions and evaluation results of Samples 1 to 31.

TABLE 1

| Samples No. | Molar ratio m (—) | Mn (mol) | SiO$_2$ (mol) | Average grain size (μm) | ESD immunity (kV) | Apparent dielectric constant $\epsilon r_{APP}$ (—) | Resistivity logρ (ρ: Ω·cm) |
|---|---|---|---|---|---|---|---|
| 1* | 1.000 | 0 | 0.1 | 0.28 | 30 or more | 860 | 9.0 |
| 2* | 1.010 | 0 | 0.1 | 0.25 | 30 or more | 780 | 9.6 |
| 3* | 1.015 | 0 | 0.1 | 0.23 | 30 or more | 790 | 9.6 |
| 4* | 1.020 | 0 | 0.1 | 0.23 | 30 or more | 760 | 9.7 |
| 5* | 1.050 | 0 | 0.1 | 0.19 | 30 or more | 380 | 9.9 |
| 6* | 1.000 | 0.1 | 0.1 | 1.15 | 30 or more | 1720 | 8.5 |
| 7 | 1.010 | 0.1 | 0.1 | 0.56 | 30 or more | 1630 | 9.7 |
| 8 | 1.015 | 0.1 | 0.1 | 0.50 | 30 or more | 1630 | 9.8 |
| 9 | 1.020 | 0.1 | 0.1 | 0.39 | 30 or more | 1440 | 9.9 |
| 10* | 1.050 | 0.1 | 0.1 | 0.23 | 30 or more | 510 | 9.9 |
| 11* | 1.000 | 0.3 | 0.1 | 1.22 | 30 or more | 2300 | 8.7 |
| 12 | 1.010 | 0.3 | 0.1 | 0.61 | 30 or more | 2200 | 9.9 |
| 13 | 1.015 | 0.3 | 0.1 | 0.53 | 30 or more | 2110 | 10.0 |
| 14 | 1.020 | 0.3 | 0.1 | 0.42 | 30 or more | 1910 | 10.0 |
| 15* | 1.050 | 0.3 | 0.1 | 0.26 | 30 or more | 670 | 10.0 |
| 16* | 1.000 | 0.45 | 0.1 | 1.41 | 30 or more | 2680 | 8.9 |
| 17 | 1.010 | 0.45 | 0.1 | 0.70 | 30 or more | 2680 | 10.0 |
| 18 | 1.015 | 0.45 | 0.1 | 0.61 | 30 or more | 2390 | 10.1 |
| 19 | 1.020 | 0.45 | 0.1 | 0.57 | 30 or more | 2300 | 10.1 |
| 20* | 1.050 | 0.45 | 0.1 | 0.26 | 30 or more | 700 | 10.1 |
| 21* | 1.000 | 0.5 | 0.1 | 1.41 | 30 or more | 2970 | 8.9 |
| 22 | 1.010 | 0.5 | 0.1 | 0.91 | 30 or more | 2870 | 10.3 |
| 23 | 1.015 | 0.5 | 0.1 | 0.76 | 30 or more | 2680 | 10.3 |
| 24 | 1.020 | 0.5 | 0.1 | 0.51 | 30 or more | 2390 | 10.4 |
| 25* | 1.050 | 0.5 | 0.1 | 0.27 | 30 or more | 780 | 10.4 |
| 26* | 1.000 | 0.7 | 0.1 | 1.61 | 20 | 3060 | 9.2 |

TABLE 1-continued

| Samples No. | Molar ratio m (-) | Mn (mol) | SiO$_2$ (mol) | Average grain size (μm) | ESD immunity (kV) | Apparent dielectric constant $\varepsilon r_{APP}$ (-) | Resistivity logρ (ρ: Ω·cm) |
|---|---|---|---|---|---|---|---|
| 27* | 1.010 | 0.7 | 0.1 | 0.91 | 20 | 2970 | 10.6 |
| 28* | 1.015 | 0.7 | 0.1 | 0.76 | 20 | 2870 | 10.6 |
| 29* | 1.020 | 0.7 | 0.1 | 0.59 | 20 | 2780 | 10.7 |
| 30* | 1.050 | 0.7 | 0.1 | 0.28 | 20 | 1050 | 10.6 |
| 31* | 0.950 | 0.1 | 0.1 | 1.95 | 30 or more | 2390 | 7.9 |

Asterisked samples are outside the scope of the present invention.

As is clear from Table 1, Samples 1 to 5 include semiconductor ceramics containing no Mn and therefore have a low apparent dielectric constant $\varepsilon r_{APP}$ of 380 to 860. This is probably because the absence of Mn, which forms a liquid phase, in grain boundary layers prevents the necking of crystal grains from being promoted to suppress the growth of the crystal grains and therefore the grain boundary layers have voids.

Samples 6, 11, 16 and 21 include semiconductor ceramics containing 0.1 to 0.5 mol of Mn per 100 mol of Ti and therefore have an apparent dielectric constant $\varepsilon r_{APP}$ of 1720 to 2970. That is, Samples 6, 11, 16 and 21 exhibit good results. However, Samples 6, 11, 16 and 21 have an average grain size exceeding 1.0 μm, and in particular, have an average grain size of 1.15 to 1.41 μm. Furthermore, Samples 6, 11, 16 and 21 have a low resistivity log ρ of 8.5 to 8.9. This is probably because the molar ratio m is 1.000. That is, since the composition of these semiconductor ceramics is stoichiometric, Sr, which prevents the growth of ceramic grains, is not present in grain boundary layers and therefore crystal grains largely grow to become coarse; hence, oxygen is prevented from reaching the grain boundary layers and Schottky barriers are prevented from being formed. This leads to a reduction in resistivity. When Samples 6, 11, 16 and 21 were prepared, the primary firing temperature was reduced to 1150-1200° C. such that the semiconductor ceramics had an average grain size of 1 μm or less; however, sintering did not occur and therefore no sintered bodies were obtained.

Samples 10, 15, 20 and 25 contain 0.1 to 0.5 mol of Mn per 100 mol of Ti. The molar ratio m is 1.050, that is, the molar ratio m is large; hence, a Sr surplus to the amount for formation of solid solutions in crystal grains precipitates in grain boundary layers; hence, the grain boundary layers have a large thickness. Therefore, Samples 10, 15, 20 and 25 have a low apparent dielectric constant $\varepsilon r_{APP}$ of 510 to 780.

Samples 26 to 30 contain 0.7 mol of Mn per 100 mol of Ti, that is, Samples 26 to 30 contain an excessive amount of Mn and therefore have a low ESD immunity of 20 kV. In particular, the molar ratio m of Sample 26 is 1.000, that is, the composition thereof is stoichiometric. Sample 26 has a large average grain size of 1.61 μm. This prevents oxygen from reaching grain boundary layers to suppress the formation of Schottky barriers. Therefore, Sample 26 has a low resistivity log ρ of 9.2.

Sample 31 corresponds to an example disclosed in Patent Document 1 (Sample 3 shown in Table 1). Sample 31 has a molar ratio m of 0.950, that is, the molar ratio m of Sample 31 is less than 1.000; hence, Sample 31 has a large average grain size of 1.95 μm and a low resistivity log ρ of 7.9. This is probably because since the molar number of a Ti site is excessive, grain boundary layers contain a MnO$_2$—SiO$_2$—TiO$_2$ liquid phase and therefore sintering is excessively promoted. Hence, crystal grains grow to become coarse and therefore oxygen is prevented from reaching the grain boundary layers, so that Schottky barriers are prevented from being formed. This leads to a reduction in resistivity.

On the other hand, Samples 7 to 9, 12 to 14, 17 to 19, and 22 to 24 have a molar ratio m of 1.010 to 1.020 and contain 0.1 to 0.5 mol of Mn per 100 mol of Ti. That is, Samples 7 to 9, 12 to 14, 17 to 19, and 22 to 24 are within the scope of the present invention. Therefore, Samples 7 to 9, 12 to 14, 17 to 19, and 22 to 24 have an ESD immunity of 30 kV or more, a resistivity log ρ of 9.7 to 10.7, an apparent dielectric constant $\varepsilon r_{APP}$ of 1440 to 2870, and an average grain size of 1.0 μm or less. In particular, Samples 7 to 9, 12 to 14, 17 to 19, and 22 to 24 have an average grain size of 0.39 to 0.91. Therefore monolithic semiconductor ceramic capacitors having good electrical properties and high reliability can be obtained. In particular, the monolithic semiconductor ceramic capacitors have an apparent dielectric constant $\varepsilon r_{APP}$ of 1000 or more, a resistivity log ρ of 9.5 or more, and an ESD immunity of 30 kV or more. The monolithic semiconductor ceramic capacitors have a small average grain size of 1.0 μm or less and are suitable for thin or compact apparatuses.

When the molar content of Mn per 100 mol of Ti is constant, an increase in the molar ratio m reduces the apparent dielectric constant $\varepsilon r_{APP}$ and the average grain size but increases the resistivity log ρ. This is probably because an increase in the molar ratio m prevents the growth of the crystal grains and therefore oxygen can readily reach grain boundary layers, so that Schottky barriers are readily formed.

Practically, a reduction in apparent dielectric constant $\varepsilon r_{APP}$ causes substantially no problem because the capacitance can be adjusted by controlling the apparent dielectric constant $\varepsilon r_{APP}$ and thickness of each semiconductor ceramic layer and the number of the semiconductor ceramic layers. An advantage that the resistivity is large can be achieved.

When the molar ratio m is constant, the apparent dielectric constant $\varepsilon r_{APP}$ and the resistivity log ρ increase with an increase in the molar content of Mn. This is probably because an increase in the molar content of Mn promotes the growth of crystal grains to increase the contact area between the crystal grains and therefore the apparent dielectric constant $\varepsilon r_{APP}$ increases. Since the formation of grain boundary levels promotes the formation of Schottky barriers, the resistivity log ρ increases. In order to allow the apparent dielectric constant $\varepsilon r_{APP}$ and the resistivity log ρ to be preferable, the molar content of Mn is preferably 0.3 to 0.5 mol per 100 mol of Ti.

EXAMPLE 2

Samples 41 to 49 different in size and/or capacitance were prepared using a semiconductor ceramic having the same composition as that of the semiconductor ceramic used to prepare Sample 22 described in Example 1 and were then evaluated.

A ceramic slurry having the same composition as that of the slurry used to prepare Sample 22 by the same procedure as that described in Example 1 was employed.

The ceramic slurry was formed into green ceramic sheets by a lip coating process. An internal electrode-forming conductive paste principally containing Ni was applied onto some of the green ceramic sheets by screen printing, whereby a conductive layer having a predetermined pattern was formed on each green ceramic sheet.

A number of the green ceramic sheets having the conductive layers were stacked in a predetermined direction. The stacked green ceramic sheets were sandwiched between the green ceramic sheets having no conductive layer. These ceramic green sheets were pressed with a pressure of 196 MPa, whereby a laminate including the green ceramic sheets and internal electrodes alternately arranged was obtained.

The laminate was degreased at 250° C. for six hours in an air atmosphere and then further degreased at 800° C. for five hours at an oxygen partial pressure in equilibrium with Ni.

The resulting laminate was primarily fired at 1190° C. for two hours in a reducing atmosphere in which the ratio of the flow rate of hydrogen to that of nitrogen was adjusted to 1:100, whereby the laminate was rendered semiconductive.

The resulting laminate was secondarily fired at 700° C. for one hour in an air atmosphere, whereby the laminate was re-oxidized. End surfaces of the laminate were polished, whereby a component body (monolithic sintered body) was prepared. In—Ga was provided on both end surfaces of the component body. Samples 41 to 49 (monolithic semiconductor ceramic capacitors) were prepared in the same manner as described above.

Samples 41 to 43 had a length L of 4 mm, a width W of 3 mm, and a thickness T of 1 mm. Samples 44 to 46 had a length L of 2 mm, a width W of 1.2 mm, and a thickness T of 1 mm. Samples 47 to 49 had a length L of 1 mm, a width W of 0.5 mm, and a thickness T of 0.5 mm. The internal electrodes of Samples 41 to 43 had an effective area of 2.8 mm². The internal electrodes of Samples 44 to 46 had an effective area of 1.8 mm². The internal electrodes of Samples 47 to 49 had an effective area of 0.24 mm².

Samples 41 to 49 were measured for average grain size, ESD immunity, and capacitance by the same procedure as that described in Example 1. The apparent dielectric constant $\in r_{APP}$ of each sample was determined from the capacitance and size of the sample.

The size of Samples 41 to 49 was adjusted by varying the number of semiconductor ceramic layers included in each sample and the thickness of the semiconductor ceramic layers such that Samples 41 to 49 had a capacitance of 25, 10 or 1 nF.

Table 2 shows the compositions and evaluation results of Samples 41 to 49.

TABLE 2

| Samples No. | Molar ratio m (-) | Mn (mol) | SiO₂ (mol) | Length L (mm) | Width W (mm) | Thickness T (mm) | Capacitance (nF) | ESD immunity (kV) | Average grain size (μm) | Apparent dielectric constant $\in r_{APP}$ (-) |
|---|---|---|---|---|---|---|---|---|---|---|
| 41 | 1.010 | 0.5 | 0.1 | 4 | 3 | 1 | 25 | 30 or more | 0.92 | 2050 |
| 42 | 1.010 | 0.5 | 0.1 | 4 | 3 | 1 | 10 | 30 or more | 0.88 | 2000 |
| 43 | 1.010 | 0.5 | 0.1 | 4 | 3 | 1 | 1 | 30 or more | 0.94 | 2030 |
| 44 | 1.010 | 0.5 | 0.1 | 2 | 1.2 | 1 | 25 | 30 or more | 0.89 | 2000 |
| 45 | 1.010 | 0.5 | 0.1 | 2 | 1.2 | 1 | 10 | 30 or more | 0.90 | 2030 |
| 46 | 1.010 | 0.5 | 0.1 | 2 | 1.2 | 1 | 1 | 30 or more | 0.87 | 1980 |
| 47 | 1.010 | 0.5 | 0.1 | 1 | 0.5 | 0.5 | 25 | 30 or more | 0.93 | 2020 |
| 48 | 1.010 | 0.5 | 0.1 | 1 | 0.5 | 0.5 | 10 | 30 or more | 0.88 | 2000 |
| 49 | 1.010 | 0.5 | 0.1 | 1 | 0.5 | 0.5 | 1 | 30 or more | 0.93 | 2020 |

As is clear from Table 2, the monolithic semiconductor ceramic capacitors have an ESD immunity of 30 kV or more although the samples have different sizes and capacitances. Every sample has an average grain size of 1.0 μm or less and an apparent dielectric constant $\in r_{APP}$ of 1000 or more. Conventional monolithic semiconductor ceramic capacitors having a small average grain size, a small size and low capacitance exhibit low strength. However, the monolithic semiconductor ceramic capacitors according to the present invention have high apparent dielectric constant $\in r_{APP}$ and an ESD immunity of 30 kV or more although they have a small size and low capacitance.

The invention claimed is:

1. A monolithic semiconductor ceramic capacitor having a varistor function, comprising a monolithic sintered body and external electrodes located on end surfaces of the monolithic sintered body, the monolithic sintered body comprising a plurality of semiconductor ceramic layers and a plurality of internal electrodes each of which is arranged between adjacent semiconductor ceramic layers, the semiconductor ceramic layers made of a semiconductor ceramic which is of a boundary insulative layer-type comprising SrTiO₃, each of the external electrodes being electrically connected to different ones of the internal electrodes, wherein the semiconductor ceramic has a Sr site, a Ti site, crystal grains and grain boundary layers and satisfies the inequality 1.000<m≦1.020 where m represents the molar ratio of the Sr site to the Ti site; the crystal grains having an average size of 1.0 μm or less and comprising a solid solution containing a donor element; the grain boundary layers containing an acceptor element in an amount greater than 0 mol and equal to or less than 0.5 mol per 100 mol of Ti.

2. The monolithic semiconductor ceramic capacitor according to claim 1, wherein the amount of the acceptor element is 0.3 to 0.5 mol per 100 mol of Ti.

3. The monolithic semiconductor ceramic capacitor according to claim 2, wherein the acceptor element is at least one member selected from the group consisting of Mn, Co, Ni and Cr.

4. The monolithic semiconductor ceramic capacitor according to any claim 3, wherein the donor element is at least one member selected from the group consisting of La, Sm, Dy, Ho, Y, Nd, Ce, Nb, Ta and W.

5. The monolithic semiconductor ceramic capacitor according to claim 4, wherein the crystal grains have an average size of 0.5 to 0.8 μm.

6. The monolithic semiconductor ceramic capacitor according to claim 5, wherein the ceramic layers contain a low-melting point oxide in an amount equal to or less than 0.1 mol per 100 mol of Ti.

7. The monolithic semiconductor ceramic capacitor according to claim 6, wherein the low-melting point oxide is $SiO_2$.

8. The monolithic semiconductor ceramic capacitor according to claim 1, wherein the acceptor element is at least one member selected from the group consisting of Mn, Co, Ni and Cr.

9. The monolithic semiconductor ceramic capacitor according to any claim 1, wherein the donor element is at least one member selected from the group consisting of La, Sm, Dy, Ho, Y, Nd, Ce, Nb, Ta and W.

10. The monolithic semiconductor ceramic capacitor according to claim 1, wherein the crystal grains have an average size of 0.5 to 0.8 μm.

11. The monolithic semiconductor ceramic capacitor according to claim 1, wherein the ceramic layers contain a low-melting point oxide in an amount equal to or less than 0.1 mol per 100 mol of Ti.

12. The monolithic semiconductor ceramic capacitor according to claim 11, wherein the low-melting point oxide is $SiO_2$.

13. The monolithic semiconductor ceramic capacitor according to claim 1, wherein the acceptor element is Mn and the amount of the donor element is not more than 0.8 mol per 100 mols of Ti.

14. The monolithic semiconductor ceramic capacitor according to claim 1, wherein the internal electrodes comprise a base metal.

15. The monolithic semiconductor ceramic capacitor according to claim 1, wherein the external electrodes comprise at least one of Ga, In, Ni and Cu.

16. A method for manufacturing monolithic semiconductor ceramic capacitor having a varistor function and containing a semiconductor ceramic which is of a boundary insulative layer-type and which contains $SrTiO_3$, the method comprising:

providing a heat treated mixture of an acceptor element and a pre-fired powder of ceramic raw materials for the ceramic layers including a donor compound in amounts such that the inequality $1.000 < m \leq 1.020$ is realized, where m represents the molar ratio of a Sr site to a Ti site in the ceramic and wherein the acceptor element amount is greater than 0 mol and equal to or less than 0.5 mol per 100 mol of Ti in the ceramic layers, forming a laminate of alternately stacked green ceramic sheets comprising the heat-treated mixture and green internal electrode layers; and firing the laminate in a reducing atmosphere and then re-oxidizing the laminate by firing the resulting laminate under oxidizing condition.

17. The method according to claim 16, wherein the crystal grains in the pre-fired powder have an average size of 1.0 μm or less.

18. The method according to claim 17, wherein the temperature at which the pre-fired powder was prepared is higher than the reduction firing temperature of the laminate.

19. The method according to claim 16, wherein the temperature at which the pre-fired powder was prepared is higher than the reduction firing temperature of the laminate.

20. The method according to claim 16, further comprising forming external electrodes electrically connected to different ones of the internal electrodes on different surfaces of the laminate.

* * * * *